United States Patent
Kim et al.

(10) Patent No.: US 12,360,793 B2
(45) Date of Patent: Jul. 15, 2025

(54) APPARATUS AND METHOD FOR PROVIDING VIRTUAL MULTI-CLOUD SERVICE

(71) Applicant: ELECTRONICS AND TELECOMMUNICATIONS RESEARCH INSTITUTE, Daejeon (KR)

(72) Inventors: Byoung-Seob Kim, Daejeon (KR); Dong-Jae Kang, Daejeon (KR); Soo-Young Kim, Daejeon (KR); Yun-Kon Kim, Daejeon (KR); Seung-Jo Bae, Daejeon (KR); Ji-Hoon Seo, Daejeon (KR); Seok-Ho Son, Daejeon (KR); Byeong-Thaek Oh, Daejeon (KR); Young-Woo Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 672 days.

(21) Appl. No.: 17/686,038

(22) Filed: Mar. 3, 2022

(65) Prior Publication Data
US 2022/0398119 A1    Dec. 15, 2022

(30) Foreign Application Priority Data
Jun. 14, 2021    (KR) .................. 10-2021-0076867

(51) Int. Cl.
G06F 9/455    (2018.01)
G06F 9/50    (2006.01)

(52) U.S. Cl.
CPC ........ *G06F 9/45558* (2013.01); *G06F 9/5072* (2013.01); *G06F 9/5077* (2013.01);
(Continued)

(58) Field of Classification Search
CPC .. G06F 9/455; G06F 9/45505; G06F 9/45533; G06F 9/45545; G06F 9/45558
See application file for complete search history.

(56) References Cited

U.S. PATENT DOCUMENTS 10,230,613 B2    3/2019    Liu et al.
10,367,714 B2    7/2019    Yoon et al.
(Continued)

FOREIGN PATENT DOCUMENTS

KR          101461217 B1    11/2014
KR    10-2015-0111801 A    10/2015
(Continued)

OTHER PUBLICATIONS

Steve Versteeg et al., "Emulation of Cloud-Scale Environments for Scalability Testing," 2012 12th International Conference on Quality Software, 2012, pp. 201-209.

*Primary Examiner* — Andy Ho

(57) ABSTRACT

Disclosed herein are an apparatus and a method for providing a virtual multi-cloud service. The apparatus for providing a virtual multi-cloud service includes one or more processors and execution memory for storing at least one program that is executed by the one or more processors, wherein the at least one program is configured to create a virtual machine cluster requested by an operator using an external cloud computing infrastructure, install a container orchestration tool in the virtual machine cluster using container-related information registered by the operator in advance, and create a virtual cloud requested by the operator using the container orchestration tool.

20 Claims, 11 Drawing Sheets

(52) U.S. Cl.
 CPC .............. *G06F 2009/45562* (2013.01); *G06F 2009/4557* (2013.01); *G06F 2009/45595* (2013.01); *G06F 2209/505* (2013.01)

(56) References Cited

U.S. PATENT DOCUMENTS

| | | |
|---|---|---|
| 10,838,756 B2 | 11/2020 | Singh et al. |
| 10,965,679 B2 | 3/2021 | Hwang et al. |
| 11,579,811 B2 | 2/2023 | Choi et al. |
| 11,822,442 B2 * | 11/2023 | Kulkarni ................ G06F 9/5072 |
| 11,822,949 B2 * | 11/2023 | Shepherd ............ G06F 9/45558 |
| 2015/0271261 A1 | 9/2015 | Park et al. |
| 2022/0237049 A1 * | 7/2022 | Wiggers ................ G06F 9/5077 |

FOREIGN PATENT DOCUMENTS

| | | |
|---|---|---|
| KR | 102187384 B1 | 12/2020 |
| KR | 10-2021-0052199 A | 5/2021 |
| KR | 10-2021-0067415 A | 6/2021 |

* cited by examiner

APPARATUS AND METHOD FOR PROVIDING VIRTUAL MULTI-CLOUD SERVICE

CROSS REFERENCE TO RELATED APPLICATION

This application claims the benefit of Korean Patent Application No. 10-2021-0076867 filed Jun. 14, 2021, which is hereby incorporated by reference in its entirety into this application.

BACKGROUND OF THE INVENTION

1. Technical Field

The present invention relates generally to multi-cloud integrated management technology, and more particularly to technology for providing large-scale virtual multi-cloud service, which provides virtual multi-cloud infrastructure and a virtual Virtual Machine (vVM).

2. Description of the Related Art

Recently, utilization of cloud computing, in which usage of computing resources for services such as artificial intelligence, big data, and the Internet of Things (IoT), which require large-scale computing infrastructure, may be flexibly and elastically utilized, has increased. In order to overcome the functional limitations and geographical limitations on a single cloud, there is a tendency toward increasing demand for a multi-cloud computing infrastructure environment in which a sufficient number of clouds are utilized.

In response to this tendency, integrated multi-cloud management platforms have appeared or are under development as open-source software (SW). Such an integrated multi-cloud management platform is a platform that enables different clouds to operate in conjunction with each other to manage large-scale cloud resources through a unified view and that provides a user with deployment, operation, and integrated management of large-scale multi-cloud infrastructure services and user applications.

It is essential to perform interworking with and utilization of a large-scale multi-cloud environment in development and testing of an integrated multi-cloud management platform itself as well as the development of the above-described multi-cloud service.

In an actual multi-cloud service used in the development of a conventional integrated multi-cloud management platform and application service, it is difficult to construct a test environment due to a variable scale or changing resource specifications. Further, long-distance communication speed and the time required for service control, which are unavoidable factors, are needed in actual cloud resource control. Such a response speed latency increases the total test execution time for the large-scale multi-cloud service, thus resulting in a problem in which launching of service is delayed. Furthermore, for a large-scale repetition test, a number of cloud resources proportional to the scale of the test must be essentially utilized, thus causing a fatal problem in that high test costs are incurred.

Meanwhile, Korean Patent Application Publication No. 10-2014-0115758 entitled "Test System and Method for Cost Reduction of Performance Test in Cloud Environment" discloses an agent-based low-cost test method, which can block communication between networks if possible while the test is being performed in a cloud environment.

SUMMARY OF THE INVENTION

Accordingly, the present invention has been made keeping in mind the above problems occurring in the prior art, and an object of the present invention is to solve the above-described disadvantages, such as difficulty in test environment construction, the problem of response speed latency, and the problem of high test costs, in a large-scale multi-cloud development and test environment.

Another object of the present invention is to provide a large-scale multi-cloud environment and a virtual machine (VM), which are fast and dynamically scalable, at low cost using small-scale (minimal) physical resources, cloud resources, etc.

In accordance with an aspect of the present invention to accomplish the above objects, there is provided an apparatus for providing a virtual multi-cloud service, including one or more processors; and an execution memory for storing at least one program that is executed by the one or more processors, wherein the at least one program is configured to create a virtual machine cluster requested by an operator using an external cloud computing infrastructure, install a container orchestration tool in the virtual machine cluster using container-related information registered by the operator in advance, and create a virtual cloud requested by the operator using the container orchestration tool.

The at least one program may be configured to create the virtual machine cluster using virtual machines created by the external computing infrastructure.

The container orchestration tool may be configured to create a namespace corresponding to a resource of the container orchestration tool, and map the namespace to a result of creation of the virtual cloud.

The at least one program may be configured to, when the virtual cloud is created, assign authority to use the virtual cloud to a user of the virtual cloud.

The at least one program may be configured to process a request for a connection of the virtual cloud to the container orchestration tool requested by the user.

The at least one program may be configured to permit the request for the connection of the virtual cloud from the container orchestration tool based on whether the user is authenticated and on whether a namespace corresponding to the virtual cloud is present.

The at least one program may be configured to return a creation result corresponding to the virtual machine, created using the container orchestration tool in response to a virtual machine creation request received from the user, to the user.

The at least one program may be configured to request the container orchestration tool to execute a container corresponding to the virtual machine creation request.

The at least one program may be configured to map container information corresponding to a result of execution of the container, received from the container orchestration tool, to the virtual machine creation result.

The virtual machine may be configured to provide a function of controlling and monitoring the virtual machine to the user.

In accordance with another aspect of the present invention to accomplish the above objects, there is provided a method for providing a virtual multi-cloud service, performed by an apparatus for providing the virtual multi-cloud service, the method including creating a virtual machine cluster requested by an operator using an external cloud computing infrastructure; installing a container orchestration tool in the virtual machine cluster using container-related information registered by the operator in advance; and creating a virtual cloud requested by the operator using the container orchestration tool.

Creating the virtual machine cluster may include creating the virtual machine cluster using virtual machines created by the external computing infrastructure.

Installing the container orchestration tool includes creating, by the container orchestration tool, a namespace corresponding to a resource of the container orchestration tool, and mapping the namespace to a result of creation of the virtual cloud.

Creating the virtual cloud may include assigning authority to use the virtual cloud to a user of the virtual cloud.

The method may further include processing a request for a connection of the virtual cloud to the container orchestration tool requested by the user.

Processing a request for a connection of the virtual cloud may include permitting the request for the connection of the virtual cloud from the container orchestration tool based on whether the user is authenticated and on whether a namespace corresponding to the virtual cloud is present.

The method may further include returning a creation result corresponding to the virtual machine, created using the container orchestration tool in response to a virtual machine creation request received from the user, to the user.

Returning the creation result to the user may include requesting the container orchestration tool to execute a container corresponding to the virtual machine creation request.

Returning the creation result to the user may include mapping container information corresponding to a result of execution of the container, received from the container orchestration tool, to the virtual machine creation result.

The method may further include providing, by the virtual machine, a function of controlling and monitoring the virtual machine to the user.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
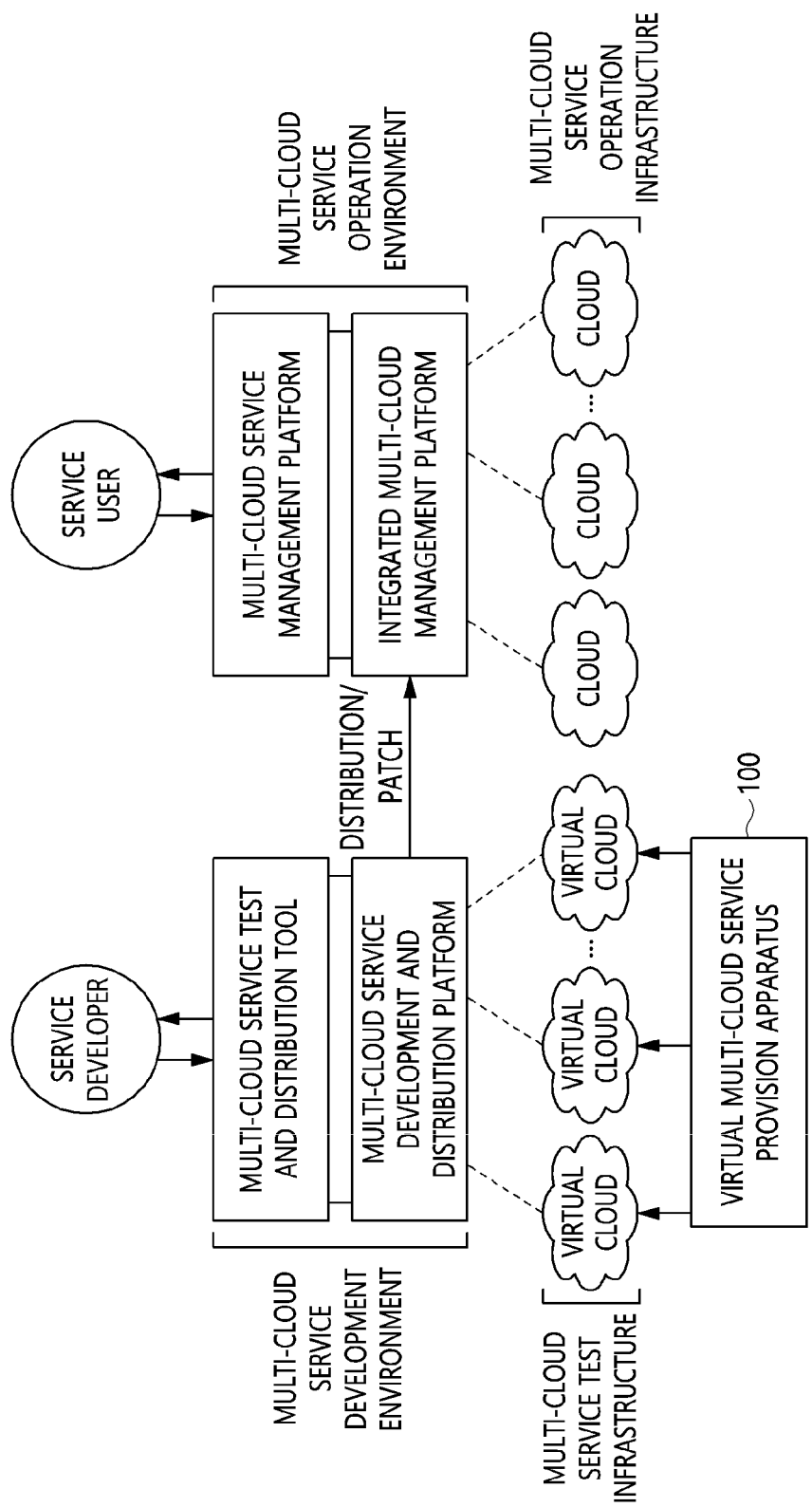
FIG. 1 is a diagram illustrating a system for providing a virtual multi-cloud service according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, preferred embodiments of the present invention will be described in detail with reference to the attached drawings.

FIG. 1 is a diagram illustrating a system for providing a virtual multi-cloud service according to an embodiment of the present invention.

Referring to FIG. 1, a multi-cloud service developer may construct and operate a dedicated test infrastructure environment for developing and testing a multi-cloud service for the purpose of service development. A multi-cloud service test infrastructure may be realized as a physical computer, a dedicated cluster, a private cloud, a commercial cloud or the like.

When the development and testing of the multi-cloud service are completed, the multi-cloud service test infrastructure may distribute, patch (upgrade), and operate the corresponding service in an actual multi-cloud service operation infrastructure by utilizing a service distributor or open automated distribution tool processing.

A multi-cloud service management platform may make control and service requests using the same method for heterogeneous cloud services through an integrated multi-cloud management platform that is capable of controlling a private cloud or multiple commercial clouds in an integrated manner.

In the configuration of such a multi-cloud service development and operation environment, a test infrastructure environment such as multi-cloud infrastructure resources and virtual machines (VM) having the same scale is required in order to perform the scale tests on a large-scale multi-cloud service. Repeated tests performed on such a scale incur enormous cloud usage expenses and are time-consuming.

The multi-cloud service operation environment described in the present invention may include environments such as a private cloud environment, a commercial cloud environment, a multi-cloud environment, a hybrid cloud environment, a hybrid multi-cloud environment, and a distributed cloud environment. These environments are referred to as a "multi-cloud" or a "multi-cloud environment" without being separately distinguished from each other in the description of the present invention.

As illustrated in FIG. 1, the present invention may be implemented as a large-scale virtual multi-cloud environment, and a service developer may rapidly and inexpensively develop the same functions and conduct tests on the same scale as in an existing large-scale multi-cloud environment through an apparatus 100 for providing a virtual multi-cloud service according to an embodiment of the present invention. When the test is completed, the developed large-scale multi-cloud service may be distributed, patched, and operated in a service operation infrastructure environment using the same method as the existing method.

Figure 2:
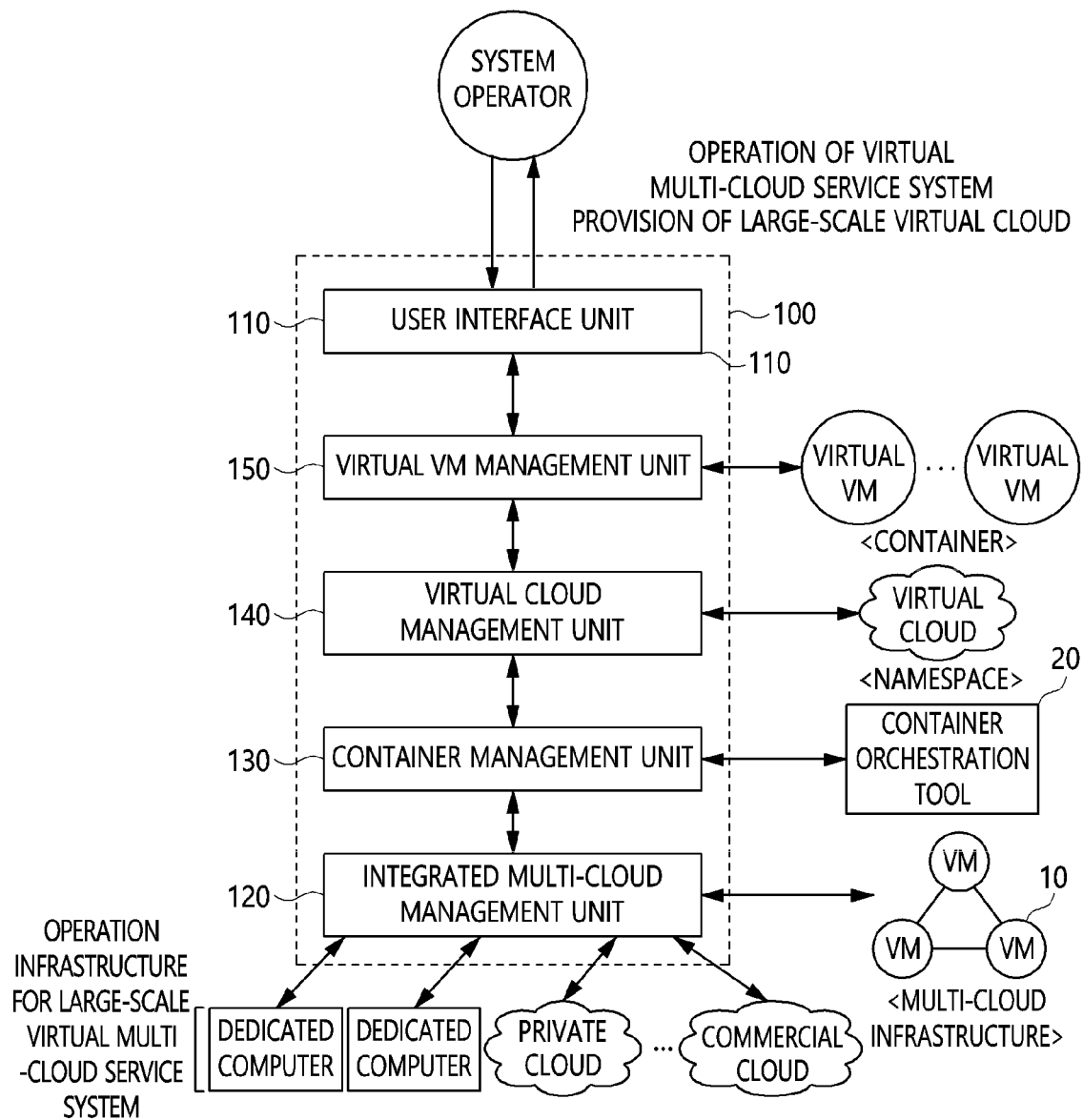
FIG. 2 is a block diagram illustrating an apparatus for providing a virtual multi-cloud service according to an embodiment of the present invention.

FIG. 2 is a block diagram illustrating an apparatus for providing a virtual multi-cloud service according to an embodiment of the present invention.

Referring to FIG. 2, an apparatus 100 for providing a virtual multi-cloud service (hereinafter also referred to as a "virtual multi-cloud service provision apparatus 100") according to an embodiment of the present invention includes a user interface unit 110, an integrated multi-cloud management unit 120, a container management unit 130, a virtual cloud management unit 140, and a virtual Virtual Machine (vVM) management unit 150.

The user interface unit 110 may receive, from a system operator, information for creation of a virtual machine cluster, information for installation of a container management (orchestration) tool, and information for creation of virtual clouds, and may output the results of processing to the system operator.

The system operator may create multiple virtual clouds suitable for the demand for a service developer using the user interface unit 110, and may allocate the virtual clouds to the service developer.

The integrated multi-cloud management unit 120 may create a virtual machine cluster 10 requested by the system operator using an external cloud computing infrastructure.

Here, the integrated multi-cloud management unit 120 may create the virtual machine cluster using the virtual machines created by the external cloud computing infrastructure.

The container management unit 130 may install a container management (orchestration) tool 20 in the virtual machine cluster 10 using the container-related information that is registered in advance by the system operator.

Here, the container orchestration tool 20 may create a namespace corresponding to the resources of the container orchestration tool 20, and may map the namespace to results of creation of the virtual clouds.

The virtual cloud management unit 140 may create the virtual cloud requested by the system operator using the container orchestration tool 20.

Here, when the virtual cloud is created, the virtual cloud management unit 140 may assign authority to use the virtual cloud to the user of the virtual cloud.

The service developer may construct and utilize a plurality of multi-cloud service test infrastructure environments while operating in conjunction with the allocated virtual cloud and utilizing the virtual VM management unit 150, and may develop and test an integrated multi-cloud management platform, which exploits a multi-cloud-based infrastructure service, or a multi-cloud service.

Here, the virtual cloud management unit 140 may process a request for the connection of the virtual cloud to the container orchestration tool 20, which is received from the service developer.

Here, the virtual cloud management unit 140 may permit the request for the connection of the virtual cloud from by the container orchestration tool 20 based on whether the user is authenticated and on whether a namespace corresponding to the virtual cloud is present.

Further, in response to a virtual machine creation request received from the service developer, the virtual cloud management unit 140 may return creation results corresponding to a virtual machine created using the container orchestration tool 20 to the user.

Here, the virtual VM management unit 150 may request the container orchestration tool 20 to execute a container corresponding to the virtual machine creation request.

Here, the virtual VM management unit 150 may map container information corresponding to the results of executing the container, received from the container orchestration tool 20, to the virtual machine creation results.

Here, the virtual machine may provide a control and monitoring function for the virtual machine to the service developer.

The apparatus and method for providing a virtual multi-cloud service according to embodiments of the present invention may improve the degree of resource usage integration so as to provide a large-scale multi-cloud environment using small-scale (minimal) resources, and may perform mapping of management resources for the improved resource usage integration degree.

Major resources managed by a system for providing a large-scale virtual multi-cloud service may include a 'multi-cloud infrastructure', a 'container orchestration tool', a 'container namespace (logical group)' provided by the container orchestration tool, and a 'container'. Respective resources may be analyzed as and mapped to different resources, as shown in the following Table 1, depending on the utilization purpose of the operator of the system for providing the large-scale virtual multi-cloud service and the service developer.

Table 1 shows mapping relationships between major resources such as a virtual cloud and a virtual VM.

TABLE 1

| Standpoint of system | Standpoint of system operator | Standpoint of service developer |
|---|---|---|
| Multi-cloud infrastructure (VM, VM cluster, etc.) | Virtual cloud management tool execution environment | Not applicable (N/A) |
| Container orchestration tool | Virtual cloud management tool | Not applicable (N/A) |
| Container orchestration tool namespace | Virtual cloud | Cloud |
| Container | Virtual VM | VM |

Referring to Table 1, the system for providing a virtual multi-cloud service may create a multi-cloud infrastructure (e.g., VM or VM cluster) to be used as the computing infrastructure of a virtual cloud by utilizing the integrated multi-cloud management platform in response to a request to create a virtual cloud management tool execution environment, received from the system operator.

As illustrated in FIG. 2, the system operator may request the container management unit 130 to install the container orchestration tool 20 in the created virtual machine (VM) cluster, and the container management unit 130 may install the container orchestration tool 20 in the virtual machine cluster 10 in response to the installation request.

When installation of the container orchestration tool 20 in the virtual machine cluster 10 is completed, the system operator may request the virtual cloud management unit 140 to create a virtual cloud.

The virtual cloud management unit 140 may create a namespace (logical group) managed by the container orchestration tool 20, and may provide the namespace.

Here, the virtual cloud created by the system operator may be provided as one cloud to the service developer.

The virtual VM management unit 150 may receive a request to create a virtual machine (VM) for the provided cloud from the service developer provided with the cloud.

In this case, the virtual VM management unit 150 may execute a virtual VM creation request on the container orchestration tool 20 for a target virtual cloud in response to the request received from the service developer.

Here, the virtual VM management unit 150 may create a container in a namespace area of a target container orchestration tool, and may provide the created container.

The service developer may install a monitoring agent, or may install and utilize a desired application, through the created virtual machine (virtual VM or container).

The integrated multi-cloud management unit 120 may provide a function of dynamically distributing computing infrastructure resources required in order to operate the system for providing the large-scale virtual multi-cloud service in response to a request received from the system operator thereof.

Table 2 shows mapping relationships between the major functions of a virtual cloud management tool execution environment and the functions of the integrated multi-cloud management platform.

Referring to Table 2, it can be seen that major functions of the integrated multi-cloud management unit 120 are illustrated.

The integrated multi-cloud management unit 120 may configure the integrated multi-cloud management platform using an existing open-source software (SW) tool. The management functions for a virtual cloud management tool execution environment may be developed so as to be mapped to multi-cloud infrastructure (VM cluster) management functions of the integrated multi-cloud management platform, as shown in Table 2.

TABLE 2

| Virtual cloud management tool execution environment management function | Integrated multi-cloud management platform function |
|---|---|
| Creation of virtual cloud management tool execution environment | Creation of multi-cloud VM cluster |
| List provision for virtual cloud management tool execution environment | List provision for multi-cloud VM cluster |
| Information provision for virtual cloud management tool execution environment | Information provision for multi-cloud VM cluster |
| Deletion of virtual cloud management tool execution environment | Deletion of multi-cloud VM cluster |

The container management unit 130 may provide a function of installing and managing the container orchestration tool 20 in the virtual machine cluster 10, which is a computing infrastructure environment created and distributed by the integrated multi-cloud management unit 120.

The container orchestration tool 20 may provide a function of distributing a container to a suitable node and operating, and managing the container in the node depending on the current status of computing infrastructure resources in response to an execution request received from the user.

Here, the container orchestration tool 20 may be utilized in the function of managing virtual clouds and virtual VMs. For example, the container orchestration tool 20 may be configured and developed using an existing open-source software (SW) tool such as Kubernetes (https://kubernetes.io). Major functions of components for installing and managing the container orchestration tool are shown in Table 3.

Table 3 shows major functions of installing and managing the container orchestration tool.

TABLE 3

Functions of installing and managing container orchestration tool

Registration and management of container orchestration tool package
Installation of container orchestration tool
Provision of container orchestration tool installation status information
Upgrade of container orchestration tool
Uninstallation of container orchestration tool The virtual cloud management unit 140 may provide functions of creating and managing a virtual cloud in response to a request received from the operator of the system for providing a virtual multi-cloud service. The virtual cloud management function may be developed using the namespace function of the container orchestration tool, as shown in Table 4.

Table 4 shows relationships between major functions of virtual cloud management and functions of the container orchestration tool.

TABLE 4

| Virtual cloud management function | Container orchestration tool function |
|---|---|
| Creation of virtual cloud | Creation of namespace |
| List provision for virtual cloud | List provision for namespace |
| Information provision for virtual cloud | Information provision for namespace |
| Deletion of virtual cloud | Deletion of namespace |

The virtual cloud management unit 140 may allocate the created virtual cloud to a user (e.g., a service developer) requiring a multi-cloud infrastructure environment, such as a multi-cloud service developer.

The virtual VM management unit 150 may provide a function of creating and managing a virtual VM (e.g., a virtual VM, a virtual machine (VM) or the like) in response to a request received from a system user who utilizes the virtual cloud, allocated by the operator of the system for providing the large-scale virtual multi-cloud service, in conjunction with the integrated multi-cloud management platform. The virtual VM management function may be developed using the container lifecycle management function of the container orchestration tool, as shown in Table 5.

Table 5 shows relationships between major functions of virtual VM management and functions of the container orchestration tool.

TABLE 5

| Virtual VM management function | Container orchestration tool function |
|---|---|
| Creation of virtual VM | Creation of container |
| List provision for virtual VM | List provision for container |
| Information provision for virtual VM | Information provision for container |
| Deletion of virtual VM | Deletion of container |

The virtual VM may be created, utilized, and managed by the user of the system for providing a virtual multi-cloud service such as a multi-cloud service developer.

The user interface unit 110 may include a system operator interface and a system user interface.

The system operator interface may be used by the system operator to operate the system for providing a virtual multi-cloud service and manage a virtual cloud.

The system user interface may allow the system user (e.g., service developer) to create and manage a virtual VM by utilizing the allocated virtual cloud.

What is to be managed through the system user interface may include only management of resources within the allocated virtual cloud.

A user interface format may include a graphical user interface such as a web management tool, a command utility format Command Line Interface (CLI) or an Application Programming Interface (API) that can be utilized for programming development.

Table 6 illustrates major functions and expected interface outlines provided by the system for providing a virtual multi-cloud service.

TABLE 6

| Function category | User function | Interface outline |
|---|---|---|
| Multi-cloud infrastructure management | Creation, information provision, and deletion of virtual machine cluster that is operation infrastructure for providing virtual cloud service | Create_cluster( ), List_cluster( ), Get_cluster( ), Delete_cluster( ) [Major management information] virtual machine cluster name virtual machine specification information for creating virtual machine, such as virtual machine image and virtual machine specification number of virtual machines to constitute cluster |
| Container orchestration tool package management | Registration, information provision, and deletion of container orchestration tool package to be installed in virtual machine cluster | Register_Container_Orchest_Tool( ), List_Container_Orchest_Tool( ), Get_Container_Orchest_Tool( ), Delete_Container_Orchest_Tool( ) [Major management information] package name package version SW package binary or SW package installation script |
| Container orchestration tool installation management | Installation, information provision, patch, and deletion of container orchestration tool in and/or from virtual machine cluster | Install_Container_Orchest_Tool( ), Get_Install_Status_Container_Orchest_Tool( ), Upgrade_Container_Orchest_Tool( ), Delete_Container_Orchest_Tool( ) [Major management information] name of container orchestration tool name of installation target virtual machine cluster name of package desired to be installed version of package desired to be installed |
| virtual cloud management | Creation, information provision, and deletion of virtual cloud | Create_vCloud( ), List_vCloud( ), Get_vCloud( ), Delete_vCloud( ) [major management information] name of virtual cloud name of target container orchestration tool |
| | Connection and disconnection of specific virtual cloud | Connect_vCloud( ), Disconnect_vCloud( ) [Major management information] name of virtual cloud connection setup information such as IP and user authentication information |
| Virtual VM management | Creation, information provision, and deletion of virtual VM | Create_vVM( ), List_vVM( ), Get_vVM( ), Delete_vVM( ) [Major management information] name of virtual VM name of target virtual cloud specification information for virtual VM creation, such as virtual VM image or virtual VM specification |

Figure 3:
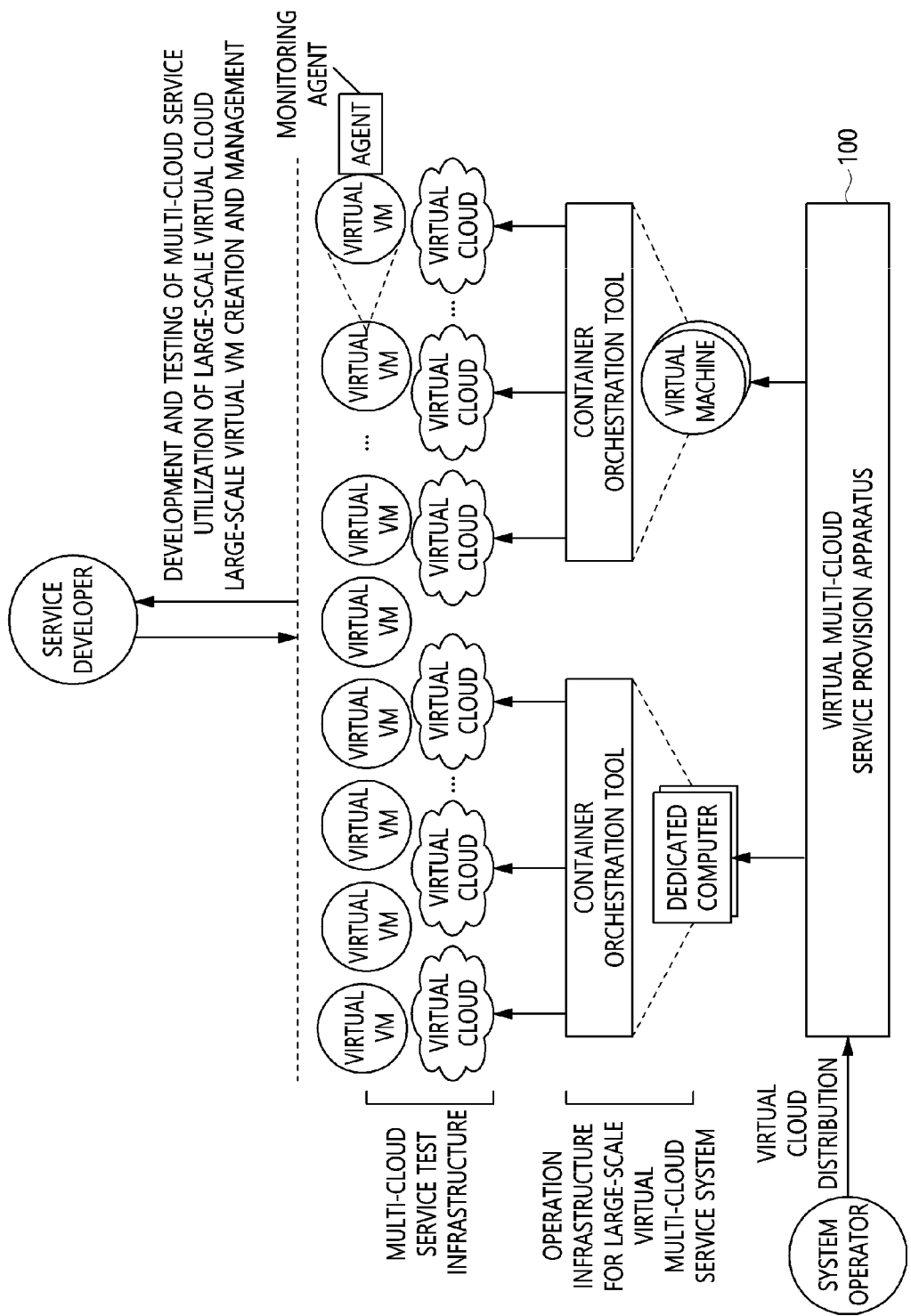
FIG. 3 is a diagram illustrating a system for providing a dynamically scalable large-scale virtual multi-cloud service according to an embodiment of the present invention.

FIG. 3 is a diagram illustrating a system for providing a dynamically scalable large-scale virtual multi-cloud service according to an embodiment of the present invention.

Referring to FIG. 3, an apparatus 100 for providing a virtual multi-cloud service may distribute a virtual machine (VM) and a virtual machine cluster using an interface related to the multi-cloud infrastructure management function shown in Table 6.

Also, the virtual multi-cloud service provision apparatus 100 may distribute a container orchestration tool using an interface related to the container orchestration tool installation management.

Further, the virtual multi-cloud service provision apparatus 100 may create virtual clouds through the virtual cloud management interface with respect to the distributed container orchestration tool.

Furthermore, the virtual multi-cloud service provision apparatus 100 may allocate the created virtual clouds to a multi-cloud service developer.

The service developer may create and control a virtual VM using an interface related to the virtual VM management function with respect to the allocated multiple virtual clouds.

In this case, the virtual VM may perform system configuration and install a monitoring agent in the same manner as an actual VM, and so the service developer may perform the development and testing of service requiring a multi-cloud environment in the same manner as an actual environment.

Further, the virtual multi-cloud service provision apparatus 100 may dynamically create a virtual machine cluster in the multi-cloud environment using an existing integrated multi-cloud management platform, thus guaranteeing not only dynamic scalability of the container orchestration tool, but also resource scalability of one 'container orchestration tool'.

Here, based on such a scalable structure, the virtual multi-cloud service provision apparatus 100 may flexibly provide a test infrastructure having a scale required for a large-scale test environment to the multi-cloud service developer.

Figure 4:
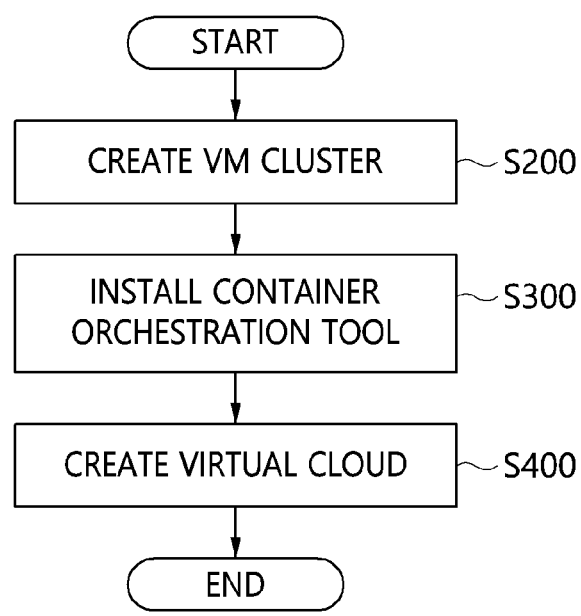
FIG. 4 is an operation flowchart illustrating a method for providing a virtual multi-cloud service according to an embodiment of the present invention.
Figure 5:
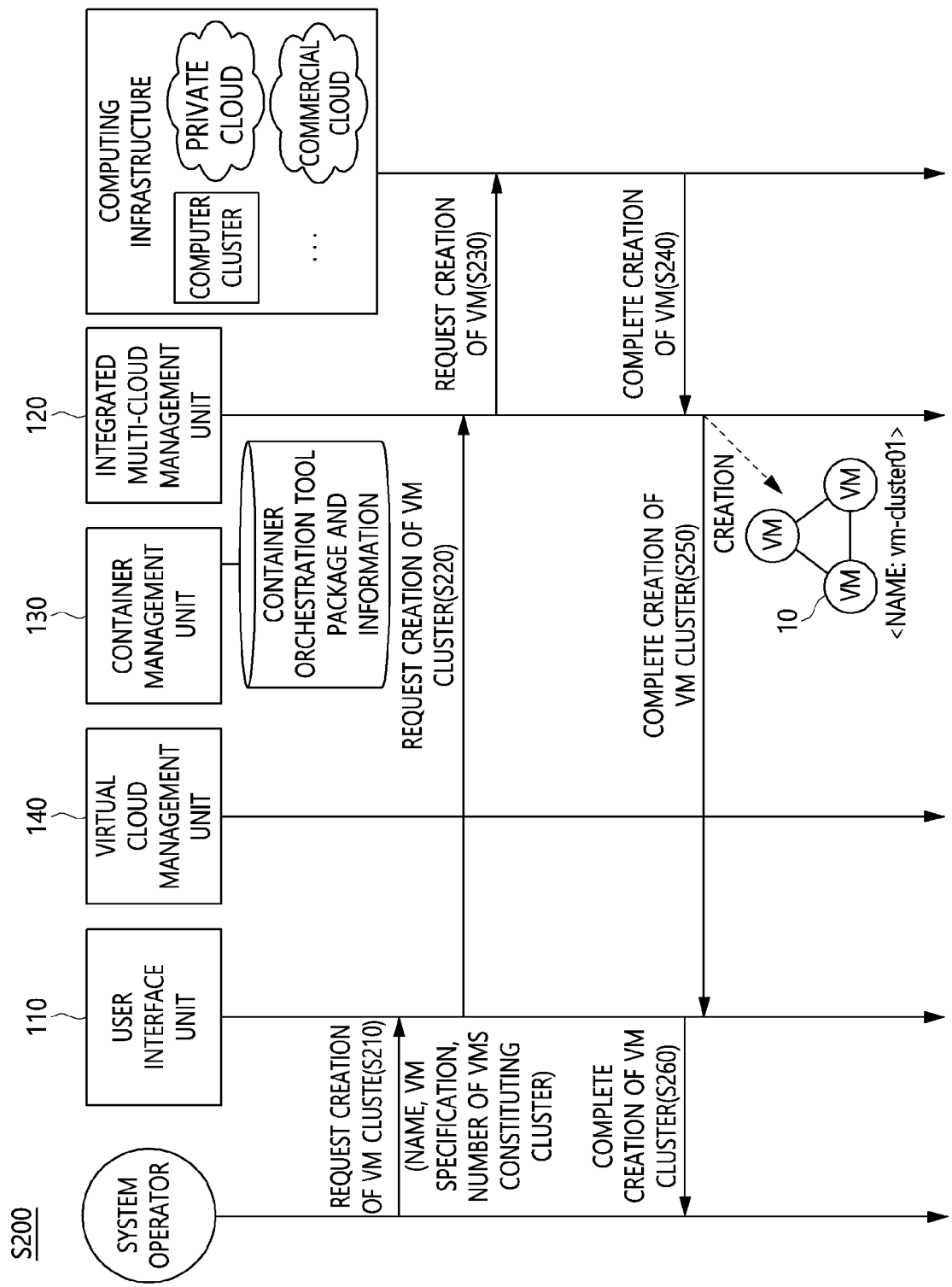
FIG. 5 is a sequence diagram illustrating in detail an example of the virtual machine cluster creation step illustrated in FIG. 4.
Figure 6:
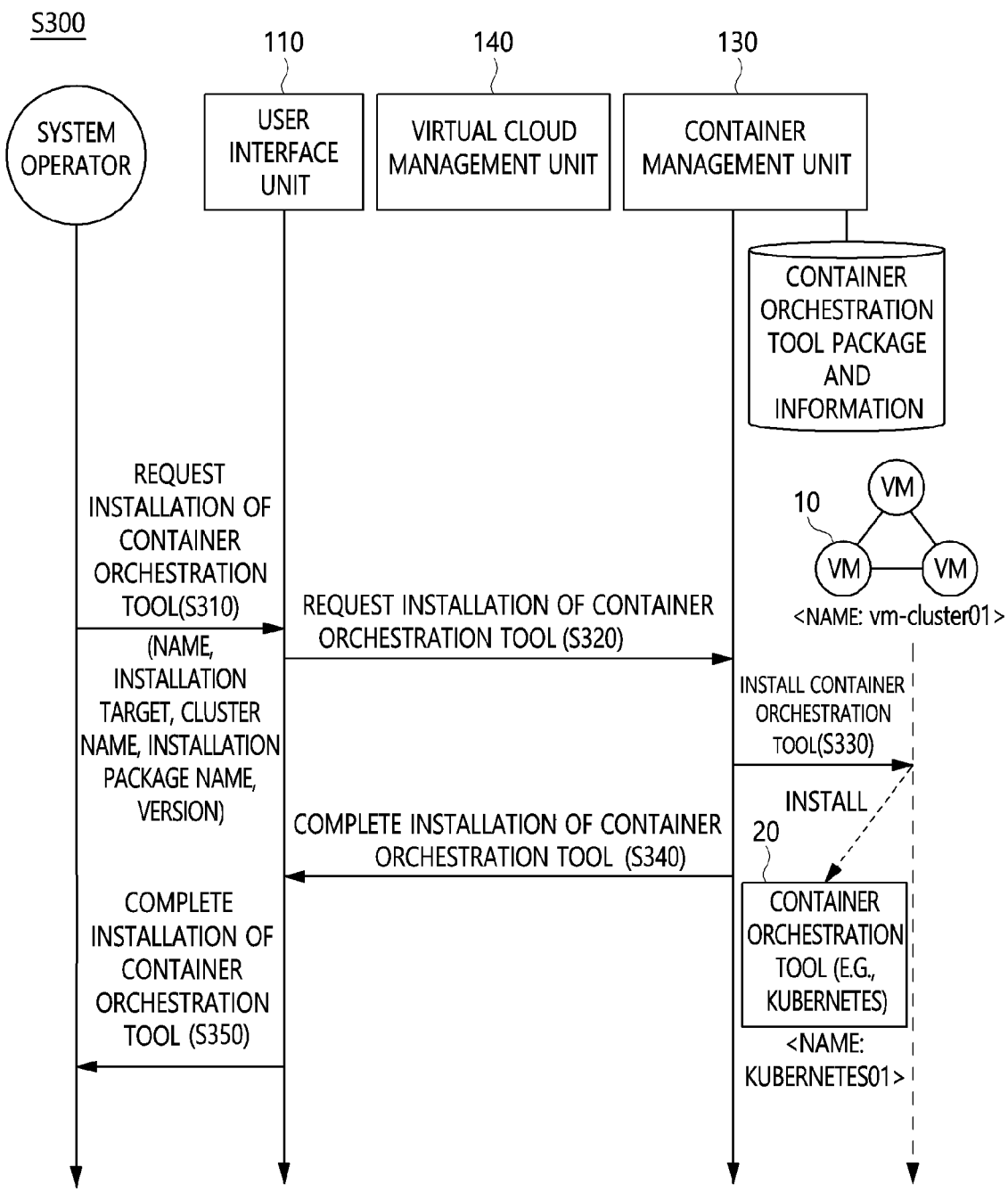
FIG. 6 is a sequence diagram illustrating in detail an example of the container orchestration tool installation step illustrated in FIG. 4.
Figure 7:
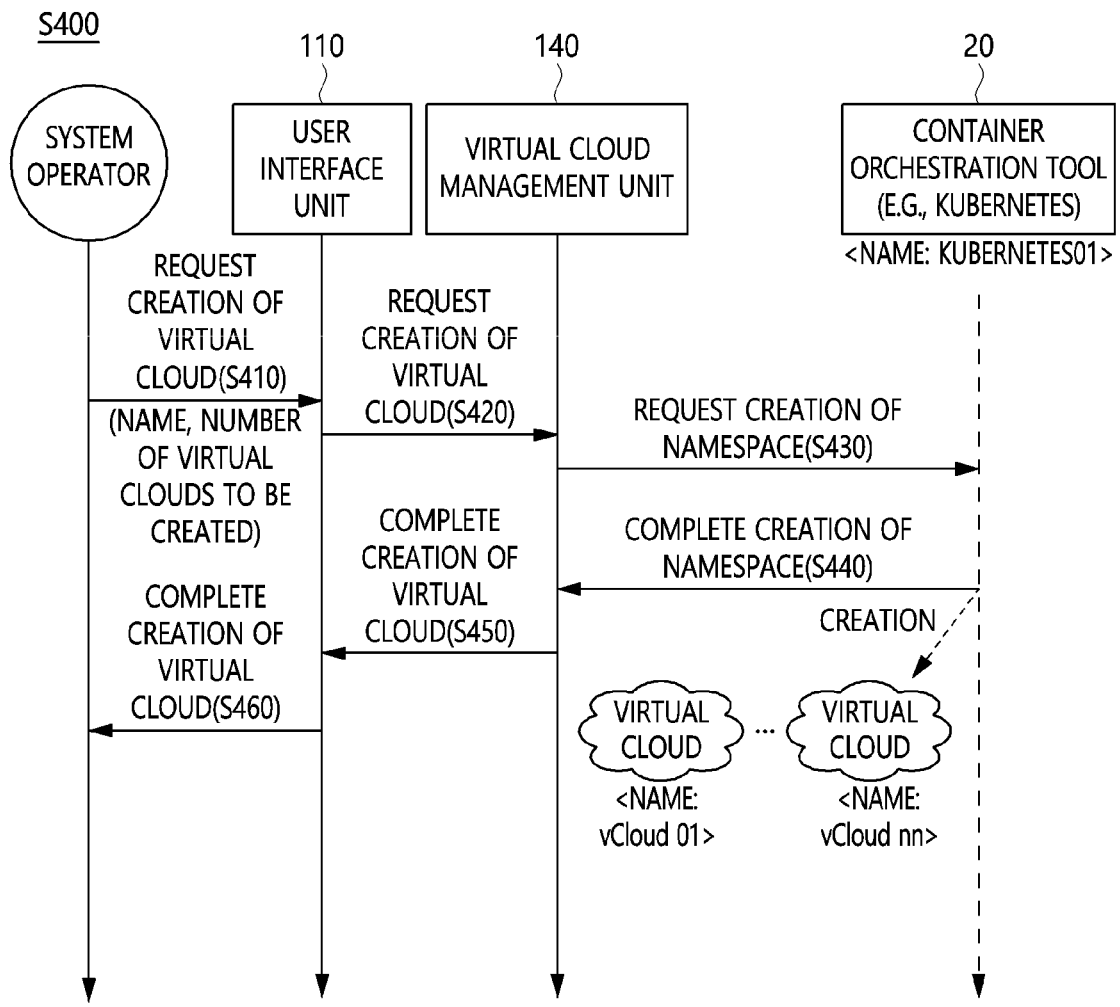
FIG. 7 is a sequence diagram illustrating in detail an example of the virtual cloud creation step illustrated in FIG. 4.

FIG. 4 is an operation flowchart illustrating a method for providing a virtual multi-cloud service according to an embodiment of the present invention. FIG. 5 is a sequence diagram illustrating in detail an example of the virtual machine cluster creation step illustrated in FIG. 4. FIG. 6 is a sequence diagram illustrating in detail an example of the container orchestration tool installation step illustrated in FIG. 4. FIG. 7 is a sequence diagram illustrating in detail an example of the virtual cloud creation step illustrated in FIG. 4.

Referring to FIG. 4, the method for providing a virtual multi-cloud service according to the embodiment of the present invention may first create a virtual machine cluster at step S200.

That is, at step S200, a virtual machine cluster requested by an operator may be created using an external cloud computing infrastructure.

Referring to FIG. 5, at step S210, a system operator may make a request to create a virtual machine (VM) cluster through the user interface unit 110.

At step 210, information required for creation of a VM cluster, that is, the name of the VM cluster, the specification of VMs, the number of VMs constituting the VM cluster, etc., may be received from the system operator.

At step S220, the integrated multi-cloud management unit 120 may receive the VM cluster creation request from the user interface unit 110, and may prepare a computing infrastructure in which a container orchestration tool to be used to provide a virtual cloud can be installed.

At step S230, the integrated multi-cloud management unit 120 may request a dedicated cluster, a private cloud, a commercial cloud, or the like, which is operated in conjunction with external cloud computing infrastructure, to create a virtual machine.

At step S240, the integrated multi-cloud management unit 120 may be provided with a computer or a created virtual machine, and may then create the shape of a virtual machine cluster that enables mutual communication.

Here, at step S240, the integrated multi-cloud management unit 120 may create the virtual machine cluster using the virtual machines created by the external cloud computing infrastructure.

At step S250, the integrated multi-cloud management unit 120 may provide the virtual machine cluster to the system operator through the user interface unit 110.

At step S260, the system operator may be provided with the virtual machine cluster through the user interface unit 110.

Next, the virtual multi-cloud service provision method according to the embodiment of the present invention may install a container orchestration tool at step S300.

That is, at step S300, a container orchestration tool 20 may be installed in the virtual machine cluster 10 using container-related information that is registered in advance by the system operator.

At step S310, the system operator may input the name of the provided virtual machine cluster 10, the name of an installation target cluster, and the name and version of an installation package through the user interface unit 110, and may request installation of the container orchestration tool 20 through the user interface unit 110.

At step S320, the name and version of the installation package input through the user interface unit 110 may be transferred, together with the installation request, to the container management unit 130, and installation of the container orchestration tool 20 in the corresponding virtual machine cluster 10 may be requested from the container management unit 130.

At step S330, the container management unit 130 may install the container orchestration tool 20 in a target virtual machine cluster 10 designated by the system operator in a version requested by the system operator using the container orchestration tool package and information registered in advance by the system operator, and may set up the container orchestration tool 20.

At step S340, the container management unit 130 may transmit the results of installation of the container orchestration tool 20 to the user interface unit 110.

At step S350, the user interface unit 110 may output the results of installation of the container orchestration tool 20 to the system operator.

Next, the virtual multi-cloud service provision method according to the embodiment of the present invention may create virtual clouds at step S400.

That is, at step S400, the virtual clouds requested by the system operator may be created using the container orchestration tool.

In detail, at step 410, when installation of the container orchestration tool is completed, the system operator may input the names of virtual clouds and the required number of virtual clouds through the user interface unit 110, and may then make a virtual cloud creation request.

At step S420, the user interface unit 110 may request the virtual cloud management unit 140 to create virtual clouds.

At step S430, the virtual cloud management unit 140 may request the container orchestration tool 20 to create a namespace corresponding to the virtual clouds.

Here, at step S430, the container orchestration tool 20 may create the namespace corresponding to the resources of the container orchestration tool 20, and may map the namespace to the results of creation of the virtual clouds.

At step S440, the container orchestration tool 20 may transfer the results of creation of the virtual clouds based on the results of creation of the namespace to the virtual cloud management unit 140.

At step S450, the virtual cloud management unit 140 may transfer the results of creation of the virtual clouds to the user interface unit 110.

At step S460, the user interface unit 110 may output the results of creation of the virtual clouds to the system operator.

Here, at step S460, when the virtual clouds are created, authority to use the virtual clouds may be assigned to the user of the virtual clouds.

Further, at step S460, when creation of the virtual clouds is completed, the system operator may provide and assign authority to use the virtual clouds to the service developer who requested utilization of the virtual clouds. Various existing methods may be applied to assignment of authority to access and use the resources.

Figure 8:
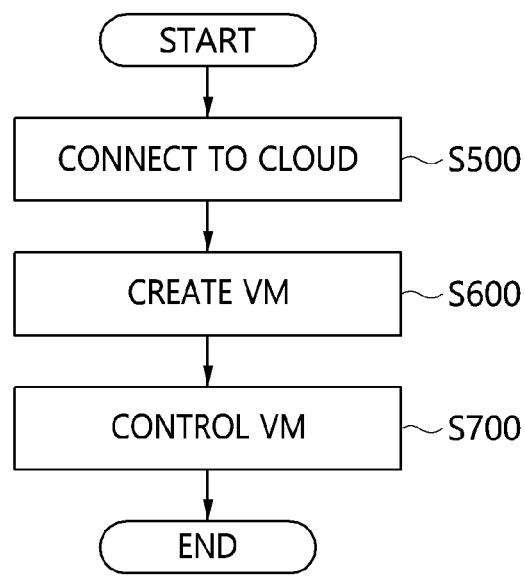
FIG. 8 is an operation flowchart illustrating an additional operation performed in the method for providing a virtual multi-cloud service according to an embodiment of the present invention.
Figure 9:
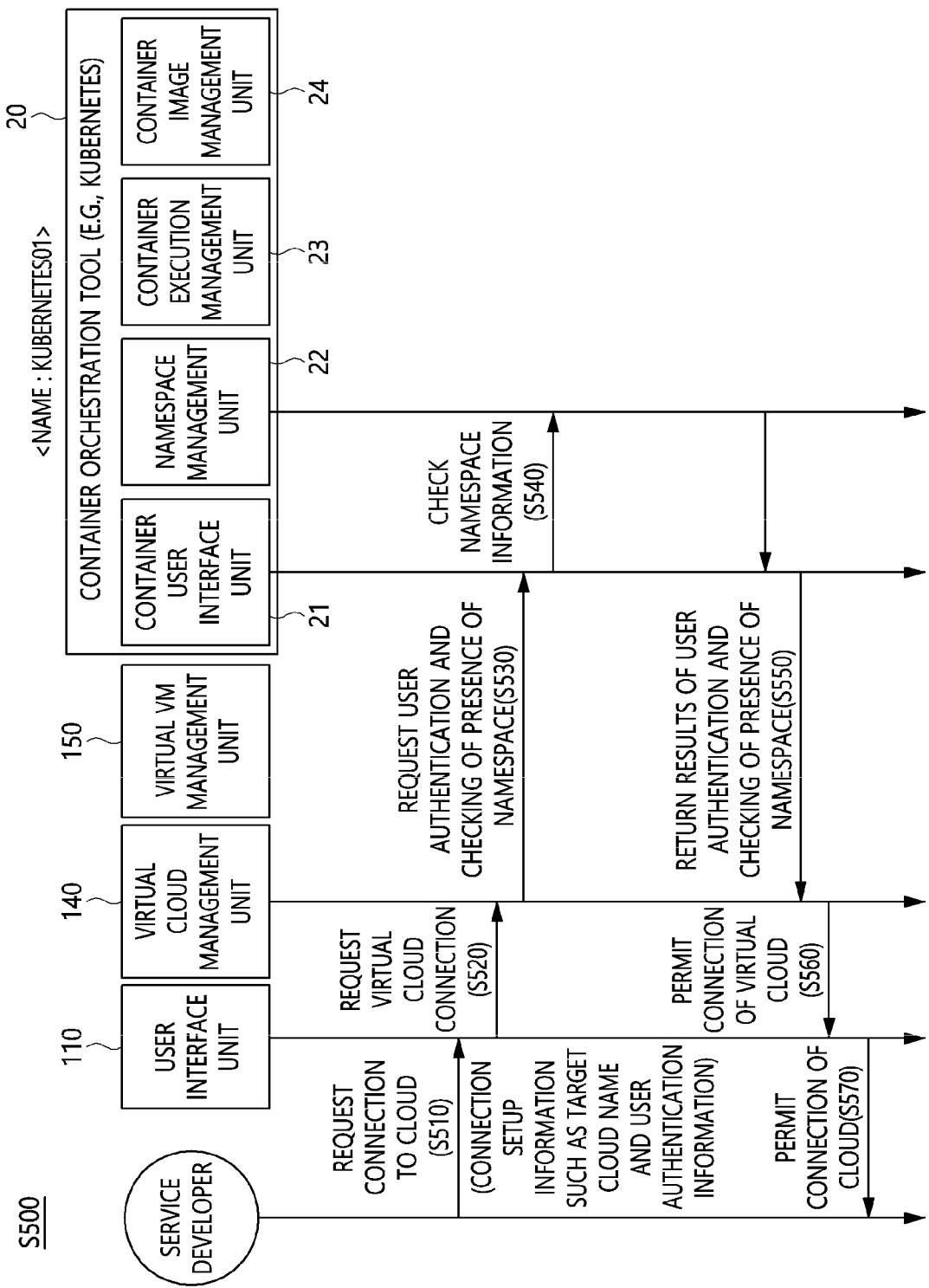
FIG. 9 is a sequence diagram illustrating in detail an example of the cloud connection step illustrated in FIG. 8.
Figure 10:
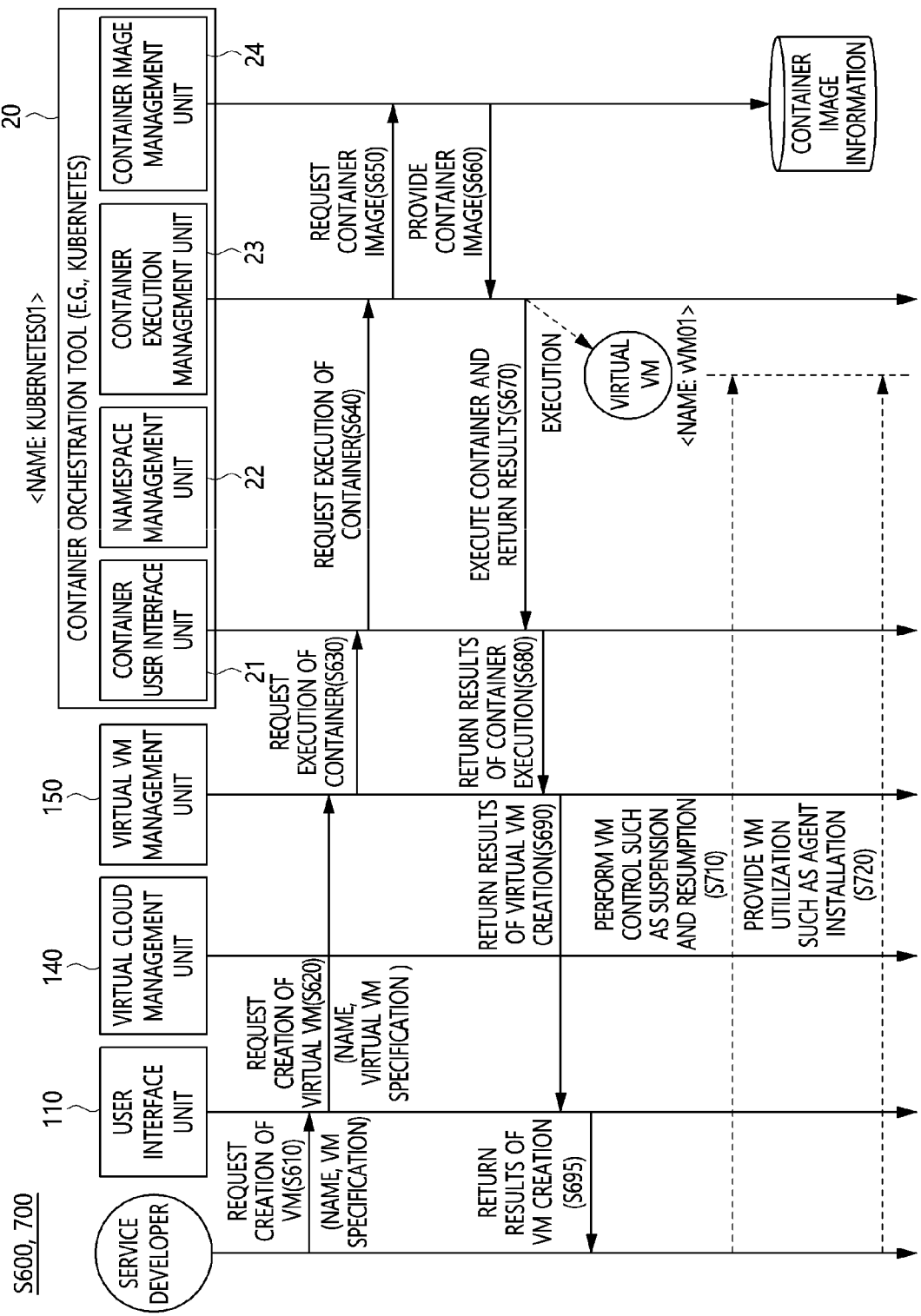
FIG. 10 is a sequence diagram illustrating in detail an example of the virtual machine creation and virtual machine control step illustrated in FIG. 8.

FIG. 8 is an operation flowchart illustrating an additional operation performed in the method for providing a virtual multi-cloud service according to an embodiment of the present invention. FIG. 9 is a sequence diagram illustrating in detail an example of the cloud connection step illustrated in FIG. 8. FIG. 10 is a sequence diagram illustrating in detail an example of the virtual machine creation and virtual machine control step illustrated in FIG. 8.

Referring to FIG. 8, it can be seen that the method for providing a virtual multi-cloud service according to an embodiment of the present invention includes additional operations performed after virtual clouds have been allocated to the service developer (service user) by the system operator, described above with reference to FIGS. 4 to 7.

The virtual multi-cloud service provision method according to the embodiment of the present invention may connect to a cloud at step S500.

That is, at step S500, a request for connection of the virtual cloud to the container orchestration tool 20 received from the service developer (i.e., a service user or a user) may be processed.

Referring to FIG. 9, at step S510, the service developer (user) may request the connection of a target cloud from the user interface unit 110 using the allocated cloud and connection setup information required for cloud connection.

At step S520, the user interface unit 110 may transfer the connection request from the service developer to the virtual cloud management unit 140.

At step S530, the virtual cloud management unit 140 may request a connection from the container user interface unit 21 of the container orchestration tool (kubernetes01) 20, which manages a target virtual cloud previously created by the container orchestration tool 20, and may request the container user interface unit 21 to check whether there is a namespace resource mapped to the virtual cloud, and the like.

At step S540, the container user interface unit 21 may request a namespace management unit 22 to check namespace information.

Here, at step S540, when there are no problems in user authentication and resource presence required for connection to the target container orchestration tool, a virtual cloud management component may return permission of cloud connection as a result of the cloud connection request from the service developer.

At step S540, the request for connection of the virtual cloud may be permitted from the container orchestration tool 20 based on whether the service developer (user) is authenticated and on whether a namespace corresponding to the virtual cloud is present.

At step S550, the user interface unit 21 may return the result of authenticating the user and checking the presence of the namespace to the virtual cloud management unit 140.

At step S560, as a result of user authentication and checking presence of the namespace, when the request for connection of the virtual cloud is permitted, the virtual cloud management unit 140 may transfer information indicating that the connection of the virtual cloud has been permitted to the user interface unit 110.

At step S570, the user interface unit 110 may transfer information indicating that the connection of the virtual cloud has been permitted to the service developer (user).

Next, the virtual multi-cloud service provision method according to the embodiment of the present invention may create a virtual machine at step S600.

Referring to FIG. 10, at step S600, when permission of the connection request has been checked, the service developer (user) may request creation of a VM through the user interface unit 110 at step S610.

Here, at step S620, in response to the VM creation request received through the user interface unit 110, the VM creation request may be mapped to a virtual VM creation request including a name and a virtual VM specification, and then the virtual VM creation request may be called to the virtual VM management unit 150.

Here, at step S630, the virtual VM management unit 150 may map the virtual VM creation request to a container distribution and execution request and call the container distribution and execution request through the container user interface unit 21 of the container orchestration tool (kubernetes01) 20, which manages previously created target virtual clouds.

Here, at step S630, execution of a container corresponding to the virtual machine creation request may be requested from the container orchestration tool 20.

At step S640, the container user interface unit 21 may request a container execution management unit 23 to distribute and execute the corresponding container.

At step S650, the container execution management unit 23 may request a container image from a container image management unit 24.

Here, at step S660, the container execution management unit 23 may distribute and execute a container through a container execution management function using the container image provided from the container image management unit 24.

At step S670, the container execution management unit 23 may create a virtual machine from the results of executing the container on the container user interface unit 21, and may return the results of executing the container and container information.

At step S680, the container user interface unit 21 may return the container execution results and the container information to the virtual VM management unit 150.

Here, at step S680, the virtual VM management unit 150 may map the container execution results and the container information to the results of virtual VM creation, and may then return the results of mapping to the user interface unit 110.

Here, at step S680, the virtual VM management unit 150 may map container information, corresponding to the results of executing the container, received from the container orchestration tool 20 to the results of creation of the virtual machine.

At step S690, the user interface unit 110 may return the results of creation of the virtual VM to the service developer (user), as the results of execution of the virtual machine, and the executed virtual machine-related information.

Here, the service developer must register the container image in advance, and this registration method is identical to that of a typical container orchestration tool utilization method, and thus a separate description thereof will be omitted in the present invention.

Next, the virtual multi-cloud service provision method according to the embodiment of the present invention may control the virtual machine at step S700.

That is, at step S700, the virtual machine 20 may provide a function of controlling and monitoring the virtual machine to the service developer (user).

In detail, at step S710, the service developer (user) may perform the same control as a typical VM, for example, suspension, resumption, and termination of a virtual machine (VM) on the virtual machine 10.

Here, at step S720, the service developer (user) may be provided with the results of utilization of VM, such as installation of a monitoring agent for VM monitoring and VM configuration, as in the case where a typical VM is utilized.

Figure 11:
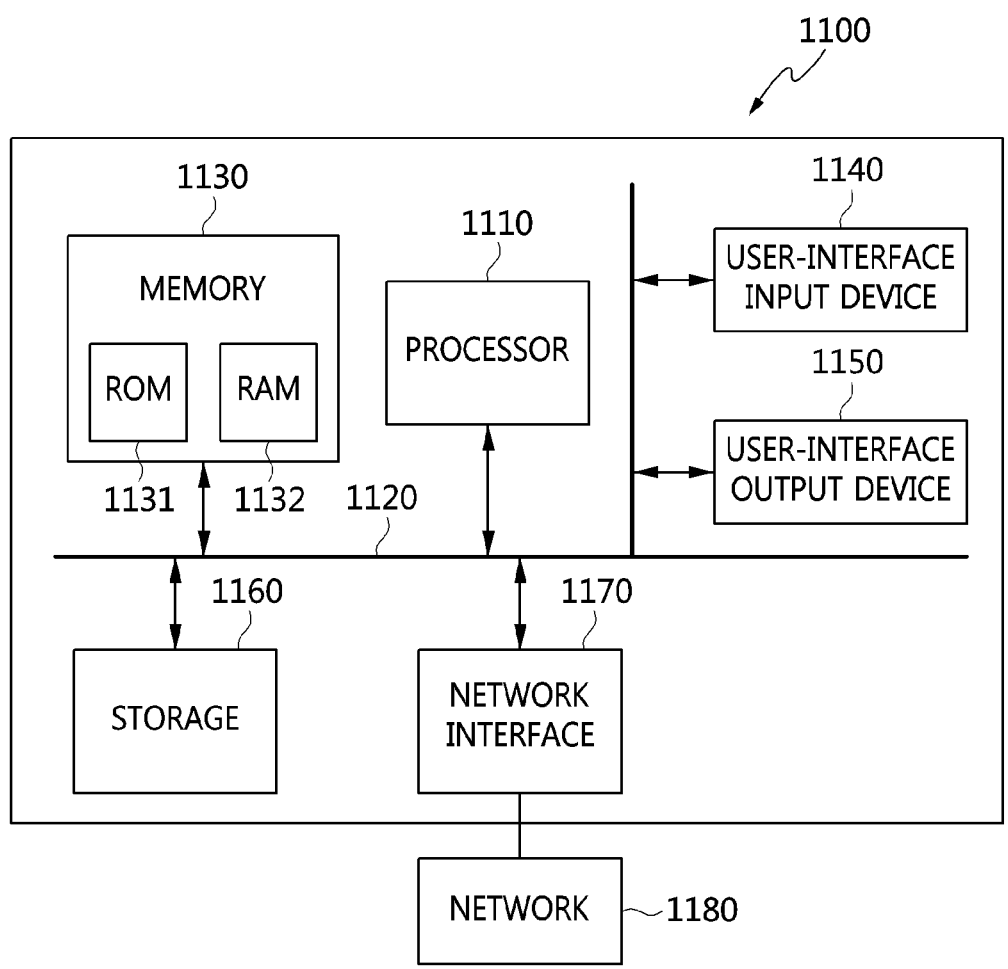
FIG. 11 is a diagram illustrating a computer system according to an embodiment of the present invention.

FIG. 11 is a block diagram illustrating a computer system according to an embodiment of the present invention.

Referring to FIG. 11, an apparatus for providing a virtual multi-cloud service according to an embodiment of the present invention may be implemented in a computer system 1100 such as a computer-readable storage medium. As illustrated in FIG. 11, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

The apparatus for providing a virtual multi-cloud service according to an embodiment of the present invention may include one or more processors 1110; and execution memory 1130 for storing at least one program that is executed by the one or more processors 1110, wherein the at least one program is configured to create a virtual machine cluster requested by an operator using an external cloud computing infrastructure, install a container orchestration tool in the virtual machine cluster using container-related information registered by the operator in advance, and create a virtual cloud requested by the operator using the container orchestration tool.

Here, the at least one program may be configured to create the virtual machine cluster using virtual machines created by the external computing infrastructure.

Here, the container orchestration tool may be configured to create a namespace corresponding to a resource of the container orchestration tool, and map the namespace to a result of creation of the virtual cloud.

Here, the at least one program may be configured to, when the virtual cloud is created, assign authority to use the virtual cloud to a user of the virtual cloud.

Here, the at least one program may be configured to process a request for a connection of the virtual cloud to the container orchestration tool requested by the user.

Here, the at least one program may be configured to permit the request for the connection of the virtual cloud from the container orchestration tool based on whether the user is authenticated and on whether a namespace corresponding to the virtual cloud is present.

Here, the at least one program may be configured to return a creation result corresponding to the virtual machine, created using the container orchestration tool in response to a virtual machine creation request received from the user, to the user.

Here, the at least one program may be configured to request the container orchestration tool to execute a container corresponding to the virtual machine creation request.

Here, the at least one program may be configured to map container information corresponding to a result of execution of the container, received from the container orchestration tool, to the virtual machine creation result.

Here, the virtual machine may be configured to provide a function of controlling and monitoring the virtual machine to the user.

The apparatus and method for providing a virtual multi-cloud service according to embodiments of the present invention may solve the above-described disadvantages, such as difficulty in test environment construction, the problem of response speed latency, and the problem of high test costs, in a large-scale multi-cloud development and test environment.

Further, the present invention may provide a large-scale multi-cloud environment and a virtual machine (VM), which are fast and dynamically scalable, at low cost using small-scale physical resources, cloud resources, etc.

As described above, in the apparatus and method for providing a virtual multi-cloud service according to the present invention, the configurations and schemes in the above-described embodiments are not limitedly applied, and some or all of the above embodiments can be selectively combined and configured such that various modifications are possible.

What is claimed is:

1. An apparatus for providing a virtual multi-cloud service, comprising:
   one or more processors; and
   an execution memory for storing at least one program that is executed by the one or more processors,
   wherein the at least one program is configured to:
   create a virtual machine cluster requested by an operator using an external cloud computing infrastructure,
   install a container orchestration tool in the virtual machine cluster using container-related information registered by the operator in advance, and
   create a virtual cloud requested by the operator using the container orchestration tool,
   wherein the at least one program is configured to create the virtual cloud by receiving, through a user interface, a name of the virtual cloud and a required number of the virtual cloud, wherein the user interface includes a system operator interface and a system user interface, wherein the system operator interface is used by the operator to operate the apparatus for providing the virtual multi-cloud service and to manage the virtual cloud, and wherein the system user interface is used by a user to create a virtual machine by utilizing an allocated virtual cloud.

2. The apparatus of claim 1, wherein the at least one program is configured to create the virtual machine cluster using virtual machines created by the external computing infrastructure.

3. The apparatus of claim 1, wherein the container orchestration tool is configured to create a namespace corresponding to a resource of the container orchestration tool, and map the namespace to a result of creation of the virtual cloud.

4. The apparatus of claim 1, wherein the at least one program is configured to, when the virtual cloud is created, assign authority to use the virtual cloud to the user.

5. The apparatus of claim 4, wherein the at least one program is configured to process a request for a connection of the virtual cloud to the container orchestration tool requested by the user.

6. The apparatus of claim 5, wherein the at least one program is configured to permit the request for the connection of the virtual cloud from the container orchestration tool based on whether the user is authenticated and on whether a namespace corresponding to the virtual cloud is present.

7. The apparatus of claim 5, wherein the at least one program is configured to return a creation result corresponding to the virtual machine, created using the container orchestration tool in response to a virtual machine creation request received from the user, to the user.

8. The apparatus of claim 7, wherein the at least one program is configured to request the container orchestration tool to execute a container corresponding to the virtual machine creation request.

9. The apparatus of claim 8, wherein the at least one program is configured to map container information corresponding to a result of execution of the container, received from the container orchestration tool, to the virtual machine creation result.

10. The apparatus of claim 9, wherein the virtual machine is configured to provide a function of controlling and monitoring the virtual machine to the user.

11. A method for providing a virtual multi-cloud service, performed by an apparatus for providing the virtual multi-cloud service, the method comprising:

creating a virtual machine cluster requested by an operator using an external cloud computing infrastructure;

installing a container orchestration tool in the virtual machine cluster using container-related information registered by the operator in advance; and creating a virtual cloud requested by the operator using the container orchestration tool, wherein creating the virtual machine cloud comprises:

creating the virtual cloud by receiving, through a user interface, a name of the virtual cloud and a required number of the virtual cloud, wherein the user interface includes a system operator interface and a system user interface, wherein the system operator interface is used by the operator to operate the apparatus for providing the virtual multi-cloud service and to manage the virtual cloud, and wherein the system user interface is used by a user to create a virtual machine by utilizing an allocated virtual cloud.

12. The method of claim 11, wherein creating the virtual machine cluster comprises:

creating the virtual machine cluster using virtual machines created by the external computing infrastructure.

13. The method of claim 11, wherein installing the container orchestration tool comprises:

creating, by the container orchestration tool, a namespace corresponding to a resource of the container orchestration tool, and mapping the namespace to a result of creation of the virtual cloud.

14. The method of claim 11, wherein creating the virtual cloud comprises:

assigning authority to use the virtual cloud to the user.

15. The method of claim 11, further comprising:

processing a request for a connection of the virtual cloud to the container orchestration tool requested by the user.

16. The method of claim 15, wherein processing a request for a connection of the virtual cloud comprises:

permitting the request for the connection of the virtual cloud from the container orchestration tool based on whether the user is authenticated and on whether a namespace corresponding to the virtual cloud is present.

17. The method of claim 15, further comprising:

returning a creation result corresponding to the virtual machine, created using the container orchestration tool in response to a virtual machine creation request received from the user, to the user.

18. The method of claim 17, wherein returning the creation result to the user comprises:

requesting the container orchestration tool to execute a container corresponding to the virtual machine creation request.

19. The method of claim 18, wherein returning the creation result to the user comprises:

mapping container information corresponding to a result of execution of the container, received from the container orchestration tool, to the virtual machine creation result.

20. The method of claim 19, further comprising:

providing, by the virtual machine, a function of controlling and monitoring the virtual machine to the user.

* * * * *